United States Patent
Lie et al.

(10) Patent No.: US 8,599,749 B2
(45) Date of Patent: Dec. 3, 2013

(54) APPARATUS AND METHOD OF SEARCHING MULTI-CARRIER ACTIVE SET PILOTS

(75) Inventors: Gregory R. Lie, San Diego, CA (US); Lijun Lin, Escondido, CA (US); Robert K. Chan, La Jolla, CA (US); Manasi D. Gandhi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 746 days.

(21) Appl. No.: 12/544,334

(22) Filed: Aug. 20, 2009

(65) Prior Publication Data

US 2011/0044294 A1  Feb. 24, 2011

(51) Int. Cl.
*H04W 4/00* (2009.01)
*H04B 3/10* (2006.01)
*H04J 3/14* (2006.01)

(52) U.S. Cl.
USPC ............ 370/328; 370/332; 370/491; 370/500

(58) Field of Classification Search
None
See application file for complete search history.

(56) References Cited

U.S. PATENT DOCUMENTS

| | | | |
|---|---|---|---|
| 6,466,606 B1 | 10/2002 | Jou | |
| 6,738,438 B2 * | 5/2004 | Rick et al. | 375/343 |
| 2002/0071403 A1 * | 6/2002 | Crowe et al. | 370/331 |
| 2005/0020264 A1 * | 1/2005 | Akao et al. | 455/436 |
| 2005/0096053 A1 * | 5/2005 | Liu et al. | 455/439 |
| 2005/0232199 A1 * | 10/2005 | Liu et al. | 370/331 |
| 2007/0066232 A1 * | 3/2007 | Black | 455/67.11 |

FOREIGN PATENT DOCUMENTS

| | | |
|---|---|---|
| JP | 2003518808 A | 6/2003 |
| JP | 2009521822 A | 6/2009 |
| WO | WO03039020 | 5/2003 |

OTHER PUBLICATIONS

International Search Report and Written Opinion—PCT/US2010/046227—International Search Authority, European Patent Office, Jan. 27, 2011.
Taiwan Search Report—TW099127985—TIPO—May 30, 2013.

* cited by examiner

*Primary Examiner* — Yemane Mesfin
*Assistant Examiner* — Christine Duong
(74) *Attorney, Agent, or Firm* — Darren M. Simon (57) ABSTRACT

Apparatus and methods are described herein for detecting pilot signals. An access terminal determines whether each pilot signal in its active set can be tracked. If not, the access terminal adjusts the search window center associated with any untracked pilot to a position that allows tracking. In some aspects, a known search window center of a tracked member of a same pilot group may be used.

11 Claims, 8 Drawing Sheets

APPARATUS AND METHOD OF SEARCHING MULTI-CARRIER ACTIVE SET PILOTS

BACKGROUND

1. Field

This application relates generally to multi-carrier wireless communications, and more particularly to searching for and detecting pilot signals.

2. Background

Wireless communication systems are widely deployed to provide various types of communication (e.g., voice, data, video, etc.) to multiple users. Such systems may be based on code division multiple access (CDMA), time division multiple access (TDMA), frequency division multiple access (FDMA), orthogonal frequency division multiple access (OFDMA), or other multiple access techniques.

Multi-carrier communication systems employ multiple carriers for data transmission to a single end-point. A pilot is often transmitted from a transmitter (e.g., a base station) to a receiver (e.g., a terminal) to assist the receiver in performing various functions such as, for example, channel estimation, timing and frequency acquisition, data demodulation, received signal strength measurements, etc.

A terminal may hand-off from one base station to another. To facilitate such handoffs, the terminal periodically searches for base stations on alternate frequencies. If a terminal detects a base station which may be a candidate for handoff, it may be added to the terminals active set of base stations. The detected frequency may be one of multiple frequencies supported by the base station. However, if the terminal did not initially detect the additional frequencies, the terminal may be unable to later use those frequencies. It would be desirable to have a method of searching for and detecting multiple pilot frequencies supported by a particular base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method for detecting pilot signals in a multi-carrier network environment, comprises receiving, at an access terminal, a traffic channel update message including two or more pilot signals to be included in an active pilot set; determining whether the access terminal has stored a search window for tracking each of the two or more pilot signals; and upon determining that the access terminal has not stored a search window for one or more of the pilot signals cannot be tracked, assigning a search window center to the one or more pilot signals positioned to allow the one or more pilot signals to be tracked.

According to some aspects, an apparatus for detecting pilot signals in a multi-carrier wireless network, comprises a receiver configured to a traffic channel update message including two or more pilot signals to be included in an active pilot set; a pilot detector for maintaining one or more sets of pilot signals; and a search window calculator configured to determine whether a search window has been stored for each of the two or more pilot signals enabling each of the two or more pilot signals to be tracked, and upon determining that one or more of the pilot signals does not have a stored search window, to assign a search window center to the one or more pilot signals which allows the one or more pilot signals to be tracked.

According to some aspects, a method of assigning pilot signals in a multi-carrier wireless network comprises receiving, at an access network, a route update message indicating one or more potential pilot signals to be included in an active pilot set associated with an access terminal; and transmitting, to the access terminal, a traffic channel update message including two or more pilot signals to be included in an active pilot set, wherein the access terminal determines whether each of the two or more pilot signals has a search window associated therewith that allows the pilot signal to be tracked, and upon determining that one or more of the pilot signals do not have a search window associated therewith, assigns a search window center to the one or more pilot signals that cannot be tracked positioned to allow the one or more pilot signals to be tracked.

According to some aspects, an apparatus for assigning pilot signals comprises a receiver configured to receive a route update message indicating one or more potential pilot signals to be included in an active pilot set associated with an access terminal; a traffic channel assignment manager for determining one or more pilots from the route update message that should be included in the active pilot set; and a transmitter for transmitting a channel update message including two or more pilot signals to be included in the active pilot set, at least one of which was not previously detected by the access terminal, wherein the access terminal assigns a search window center to the at least one pilot signal that was not previously detected positioned to allow the pilot signal to be tracked by the access terminal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
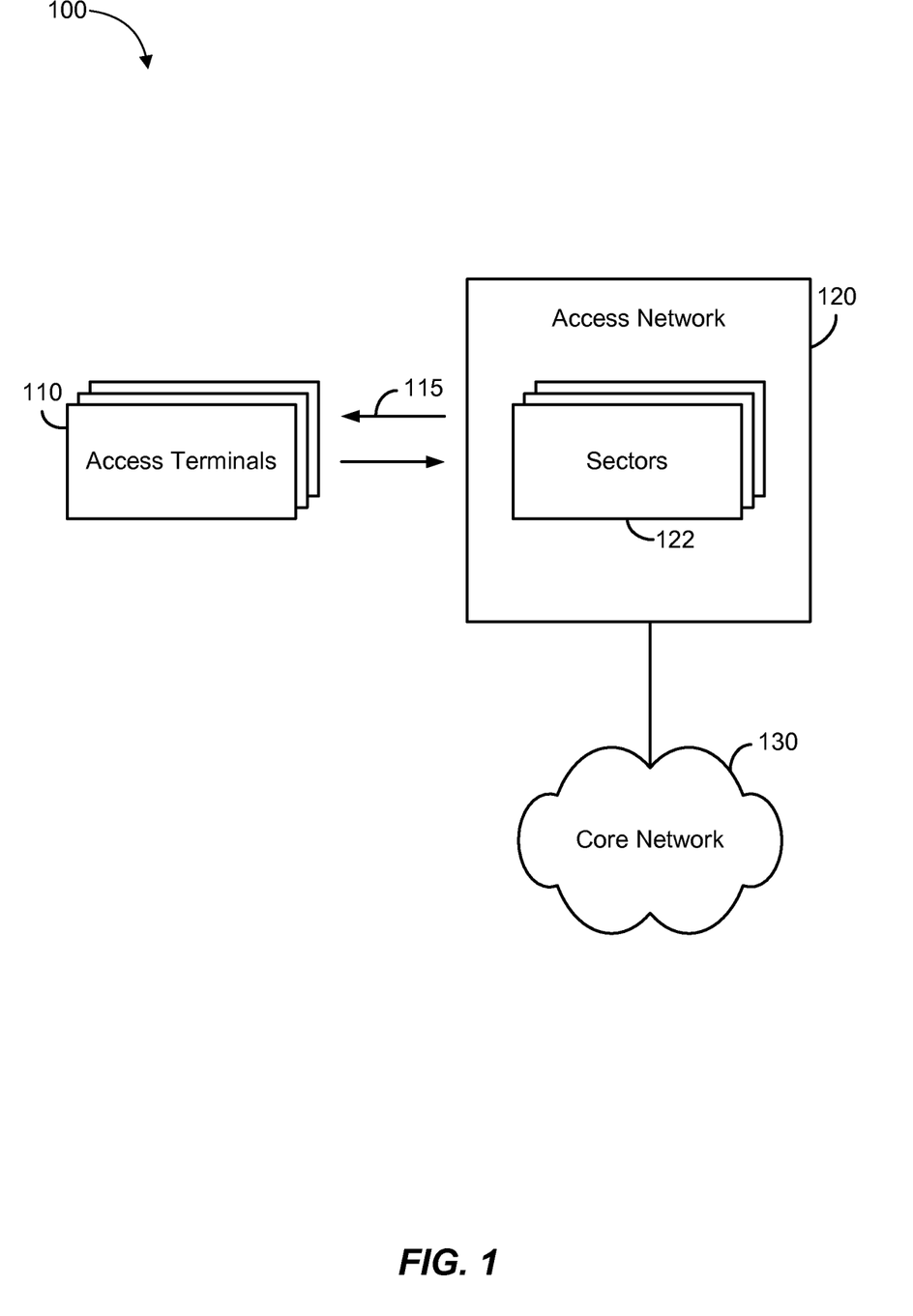
FIG. 1 is a block diagram of a wireless communication system, in accordance with various disclosed aspects.

Apparatus and methods will now be described for detecting pilot signals. Timing for carriers which have been detected by a device may be used for centering a search window for adjacent carriers which were not previously detected. FIG. 1 depicts a wireless communication network 100 capable of implementing various disclosed aspects. One or more access terminals (AT(s)) 110 may access services of a core network 130 via an access network (AN) 120. Each AT 110 may communicate with AN 120 via one or more channels at different frequencies on a forward link and/or a reverse link, as indicated by arrows 115.

AN 120 provides an interface from an AT 110 to core network 130, and may route data between AT 110 and the core network. AN 120 may also perform various radio accesses and link maintenance functions. AN 120 may include and/or implement the functions of a base station controller (BSC), base station transceiver (BTS), Node B, etc. AT(s) 110 may include, for example, a wireless phone, a laptop computer, a cellular phone, a personal digital assistant (PDA), and/or other wireless devices. Core network 130 may support one or more standards such as, for example, cdma2000, W-CDMA, IS-95, and/or other multi-carrier standards.

Figure 2:
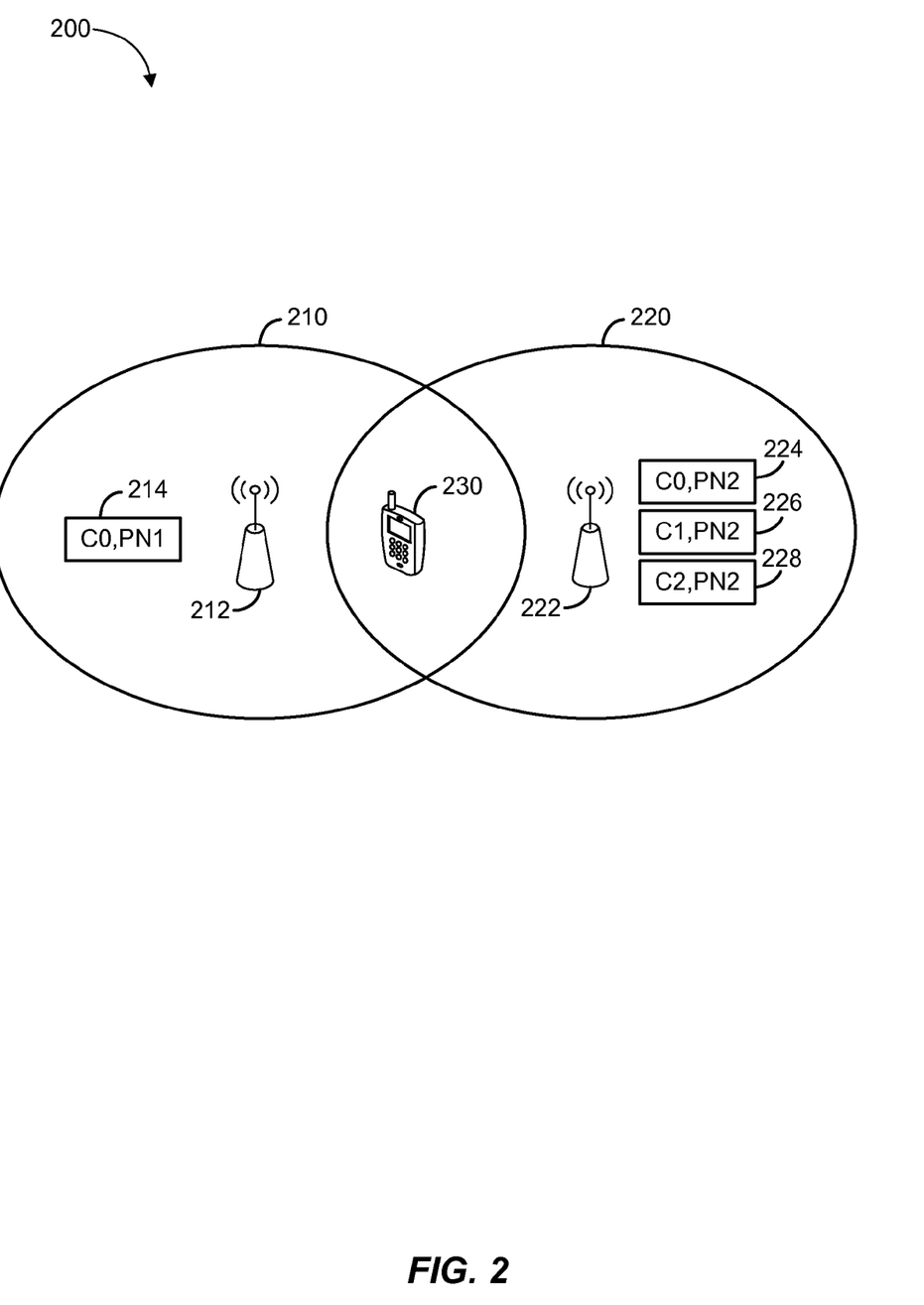
FIG. 2 is a simplified block diagram depicting two network sectors, in accordance with various discloses aspects.

Access network 120 may serve as an interface for ATs within a predefined service area or cell. According to some aspects, the access network and/or cell may be divided into multiple sectors 122. In some aspects, each sector 122 may have associated therewith a base station for servicing the sector. In other aspects, a single base station may serve multiple sectors. FIG. 2 depicts an exemplary access network 200.

As illustrated in FIG. 2, AN 200 may include a first sector 210 and a second sector 220. Though only two sectors are shown, AN 200 may include any number of sectors. Each sector 210, 220 may include a base station. Sector 210 may include base station 212 while sector 220 may include base station 222.

A pilot signal, or pilot, is a reference signal broadcast by base stations. An AT may detect pilots and use the detected pilots to connect to a BS. In a multi-carrier system, a base station or sector may have associated therewith one or more pilots. A pilot may be specified by an ordered pair comprising a pseudo-random number (PN) offset and a channel indicator. As depicted in FIG. 2, BS 212 may have associated therewith single pilot 214 that may be specified by ordered pair (C0, PN1). BS 222 may have associated therewith a first pilot 224 specified by ordered pair (C0, PN2), a second pilot 226 specified by ordered pair (C1, PN2), and a third pilot 228 specified by ordered pair (C2, PN2). Pilot groups may be formed of two or more pilots having the same PN offset and that are located in the same sector. For example, pilots 224, 226, and 228 may belong to the same pilot group as each has the same PN offset PN2.

An AT 230 may be configured to communicate with BS 212 and/or BS 222. That is, AT 230 may be configured to detect pilots broadcast by BS 212 and/or BS 222. AT 230 may maintain multiple sets of pilots such as, for example, an active set, a candidate set, a neighbor set, and a remaining set. The active set may identify base stations or sectors through which the AT is communicating. The candidate set may identify bases stations or sectors for which the pilots have been received at the AT with sufficient signal strength, but have not been placed in the active set by the base station. The neighbor set identifies base stations or sectors which are likely candidates for the establishment of communication with the subscriber station. The remaining set identifies base stations or sectors in the system which are not a part of any of the other sets.

When communication is initially established, AT 230 may communicate through a first base station, and its active set may include only a pilot signal of the first base station. For example, AT 230 may initially communicate through BS 212, and may include pilot signal 214 in the active set. AT 230 may periodically search its neighbor and remaining pilot sets. If AT 230 detects a strong pilot, the pilot may be promoted to the candidate set, and reported to the AN. The AN may decide to add the pilot to AT 230's active set. For example, AT 230 may detect pilot 224, and the AN may add the pilot to AT 230's active set. The AN may additionally add pilots 226 and 228, which belong to the same pilot group as pilot 224, even though these pilots were not detected by AT 230.

Each pilot set (active, candidate, neighbor, and remaining) may have associated therewith a search window. The search window indicates the distance (in chips) from a given reference point such as, for example, the current location of an AT. In a conventional access terminal, if pilots belonging to a same pilot group as a detected pilot are added to the AT's active set, the AT may not be able to locate the pilots if they are located outside of the active set search window. Thus, the AT cannot take advantage of throughput improvements associated with communicating via all pilots in a pilot group. For example, assume an AT has a neighbor set search window of 100 chips, and a neighbor pilot is detected at 70 chips. The detected neighbor pilot belongs to a pilot group comprising two additional pilots. Upon detection of the neighbor pilot, the AT may record the location of the neighbor pilot and use the location to center a search for that neighbor pilot once the neighbor pilot moves to the active set. That is, the AT may be configured to search for the detected pilot using an active set search window. The search may be centered on the previously detected position of the pilot. Though the AT is able to track the detected pilot, it may be unable to detect the two additional pilots belonging to the pilot group. This is because the AT has only recorded the location of the detected pilot. Thus, when searching for the other two pilots in the pilot group, the search remains centered on the AT's current location. However, if the active set is set to have a search window of 60 chips, for example, the AT will be unable to locate the two additional pilots of the pilot group since a search center has not been recorded for those pilots. The AT attempts to search for a pilot using its current location if a new search center has not been set. In this example, the search will fail because the location of the pilots are outside of the active search window.

Figure 3:
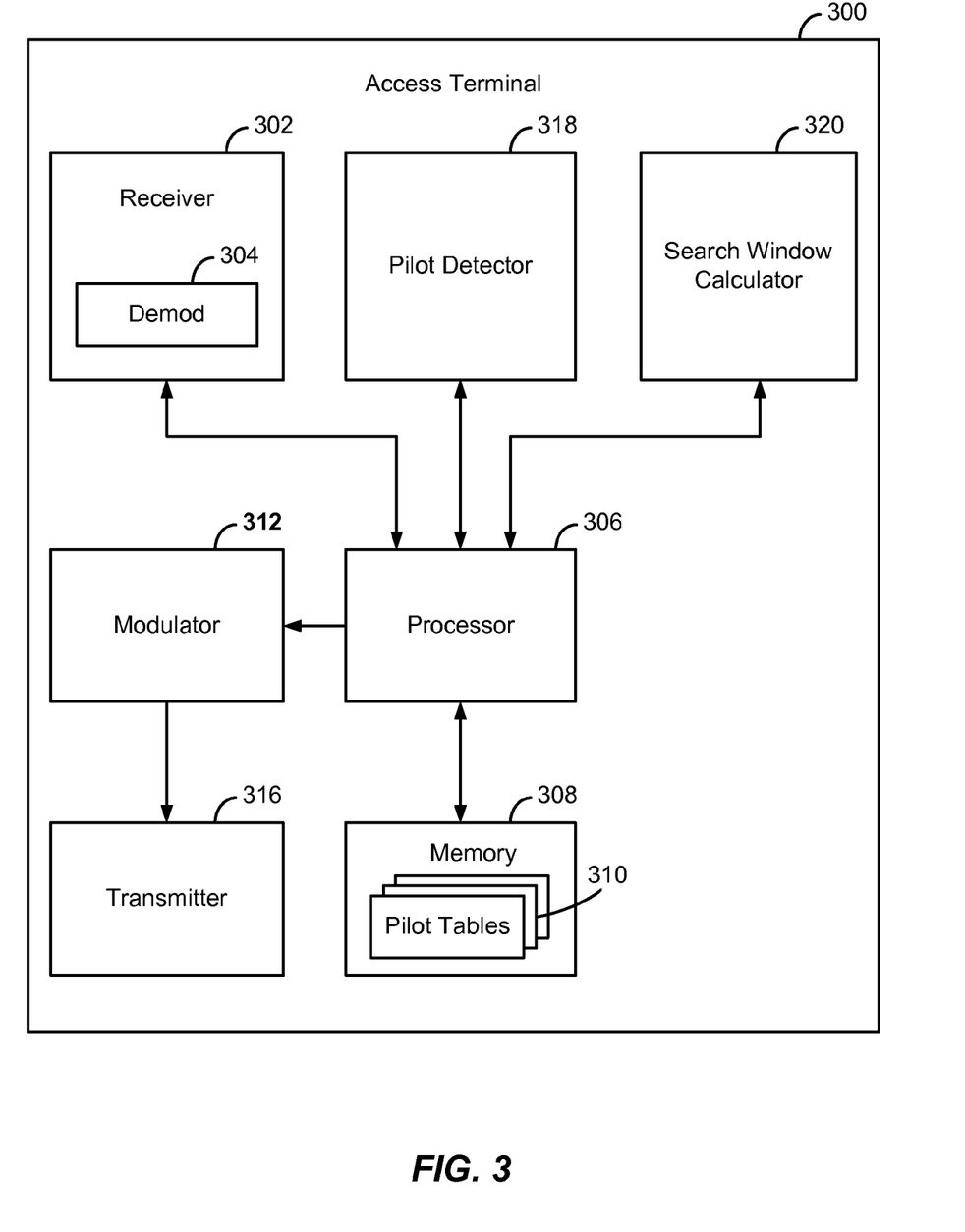
FIG. 3 is a block diagram of an access terminal, in accordance with various disclosed aspects.

FIG. 3 depicts an exemplary AT 300 incorporating various disclosed aspects which enables the use of all pilots in a pilot group. AT 300 may comprise a receiver 302 that receives a signal from, for example, a receive antenna (not shown), performs typical actions (e.g., filters, amplifies, downconverts, etc.) the received signal, and digitized the conditioned signal to obtain samples. AT 300 may also comprise a demodulator 304 that can demodulate received symbols and provide them to a processor 206. Processor 306 may be a processor dedicated to analyzing information received by receiver 302 and/or generating information for transmission by a transmitter 316 operatively coupled to a modulator 312, a processor that controls one or more components of AT 300, and/or a processor that both analyzes information received by receiver 302, generates information for transmission by transmitter 316, and controls one or more components of AT 300.

AT 300 may additionally comprise memory 308 that is operatively coupled to processor 306 and that can store data to be transmitted, received data, information related to network connectivity, and/or any other suitable information. Memory 308 may additionally store protocols and/or algorithms associated with network connectivity or other functions performed by AT 300. It will be appreciated that memory 308 may be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PRROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 308 is intended to comprise, without being limited to, these and any other suitable types of memory.

As described above, an AT, such as AT 300, may maintain lists of pilot signals, including an active set, a candidate set, and a neighbor set. Memory 308 may store one or more pilot tables 310, for storing the lists of pilot signals.

Processor 306 may further be operatively coupled to a pilot detector 318 and a search window calculator 320. Pilot detector 318 may be configured to monitor communication channels to detect and measure pilot signals. Pilot detector 318 may generate sets of active, candidate, neighbor, and remaining pilots, facilitating storage of the pilot sets in pilot tables 310.

Search windows may be used to determine pilots to be included in each set. Search window calculator 320 may be configured to set the search window size for the active, candidate, neighbor, and remaining pilot sets. Search window calculator 320 may also be configured to determine whether the active search window is set to track each active pilot in the set. If a pilot is not tracked, the search window calculator 320 may be configured to adjust the search window. For example, in the case of pilots belonging to the same pilot group, the search window calculator 320 may set the search window for untracked members of a pilot group to the search window center of the tracked pilot in the same pilot group.

Figure 4:
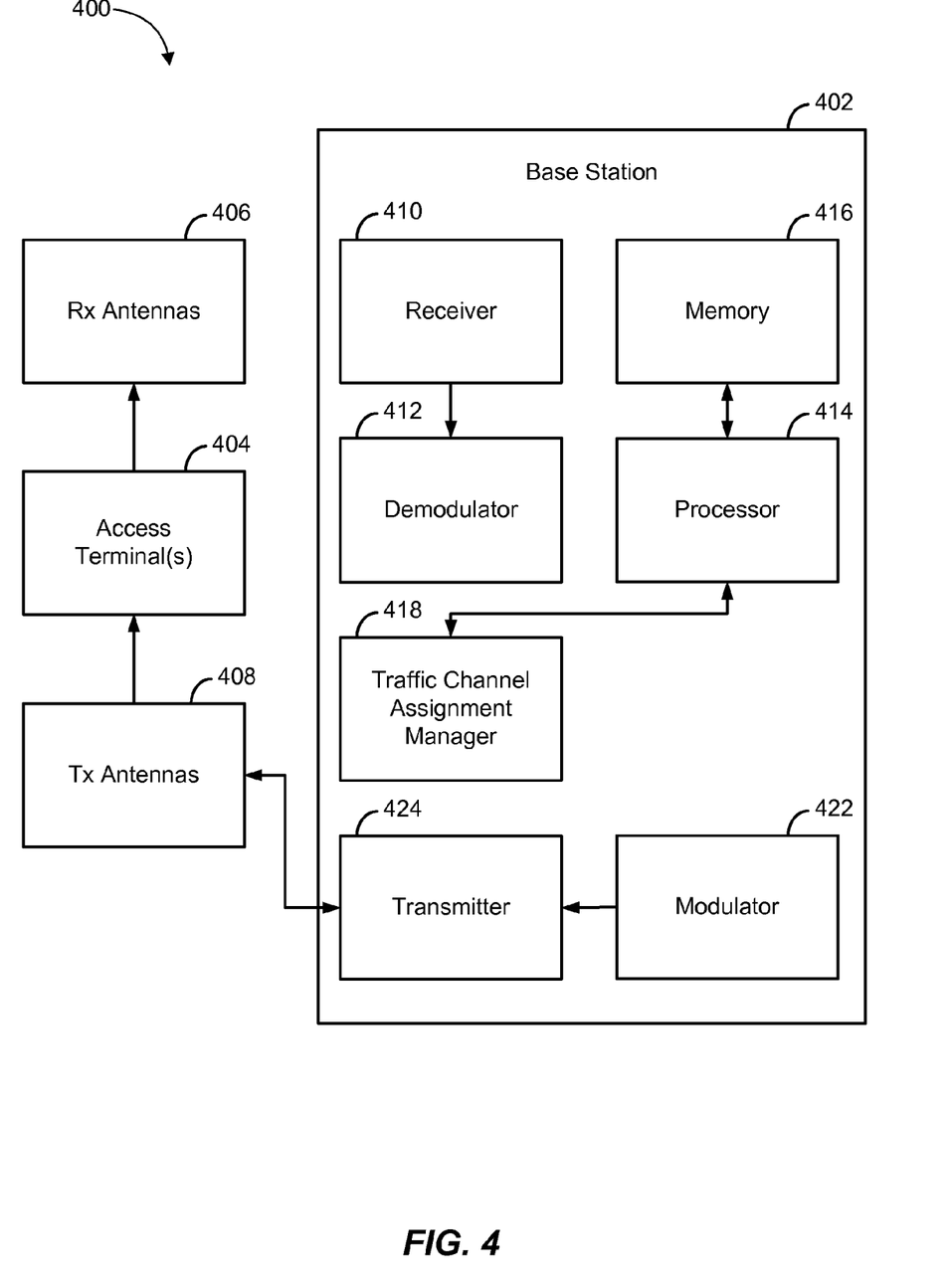
FIG. 4 is a block diagram of a base station, in accordance with various disclosed aspects.

FIG. 4 depicts an exemplary system 400 for assigning traffic channels and pilots, in accordance with various disclosed aspects. System 400 comprises a base station 402 (e.g., access point, femtocell, . . . ) with a receiver 410 that receives signal(s) from one or more mobile devices 404 through a plurality of receive antennas 406, and a transmitter 424 that transmits to the one or more mobile devices 404 through a transmit antenna 408. Receiver 410 can receive information from receive antennas 406 and is operatively associated with a demodulator 412 that demodulates received information. Demodulated symbols are analyzed by a processor 414 that can be similar to the processor described above with regard to FIG. 3, and which is coupled to a memory 416 that stores information related to channel assignment, and/or any other suitable information related to performing the various actions and functions set forth herein. Processor 414 is further coupled to a traffic channel assignment manager 416 that can provide a list of pilot signals to be included in an AT's active pilot set.

According to an example, the base station 402 can receive a route update message from one or more of the AT(s) 404. The traffic channel assignment manager 418 can determine one or more pilots from the route update message that should be include in the active pilot set related to AT(s). Although depicted as being separate from the processor 414, it is to be appreciated that the traffic channel assignment manager 418, demodulator 412, and/or modulator 422 can be part of the processor 414 or multiple processors (not shown).

Figure 5:
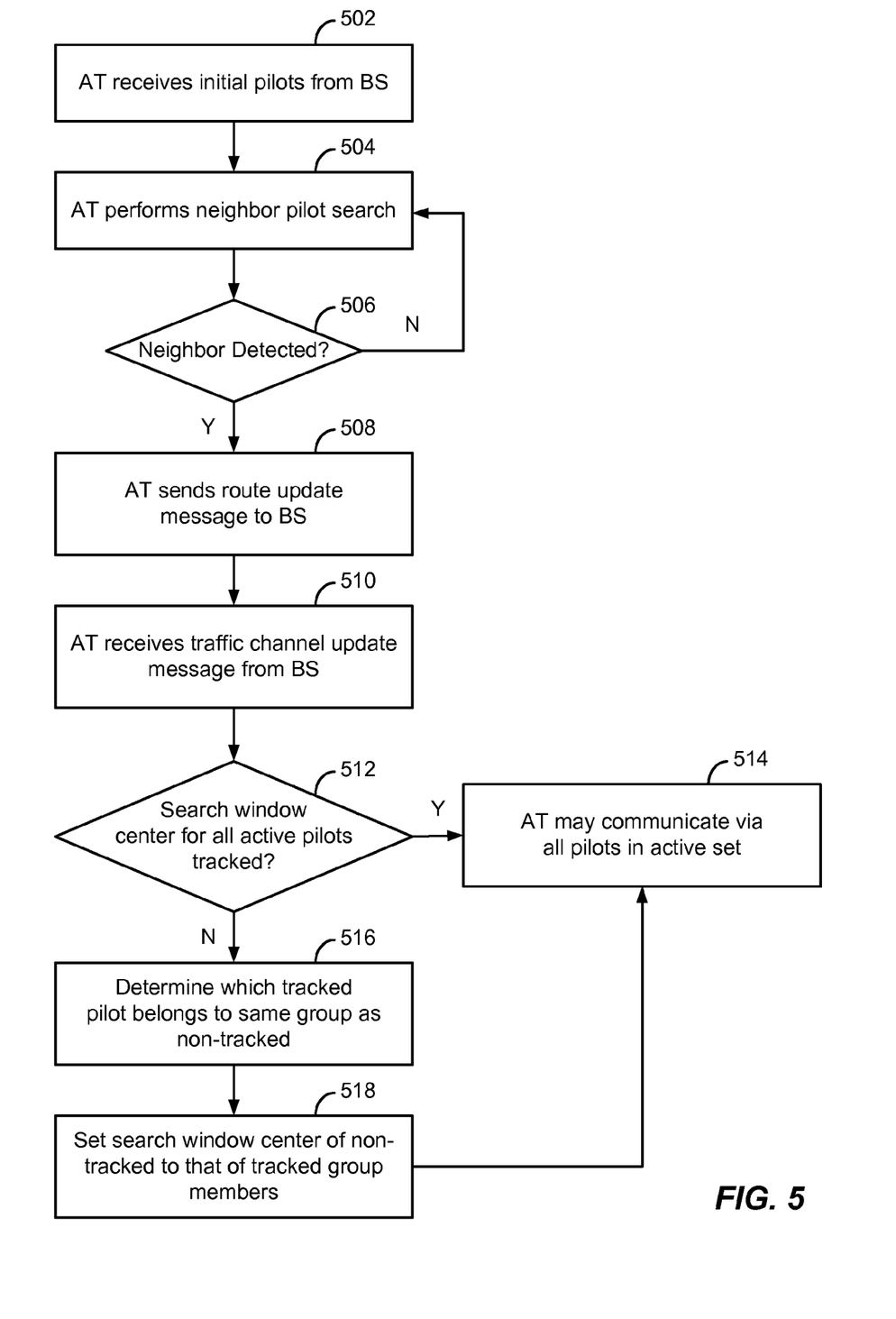
FIG. 5 is a flowchart depicting an exemplary pilot signal detection process, in accordance with various disclosed aspects.

FIG. 5 is a flowchart depicting an exemplary pilot acquisition method, in accordance with various disclosed aspects. As depicted at 502, an AT receives initial pilot assignment from a BS. This enables the AT to establish communication with the BS. According to some aspects, the pilot assignment may be provided in response to a connection request message from the AT.

As depicted at 504, the AT may periodically search for neighboring pilots, which may be associated with the same or a different BS. The AT may search for neighboring pilots within a predetermined neighbor search window. According to some aspects, the neighbor search window is configured by the AT. In other aspects, it may be defined by the BS. The search window may be defined, for example, as a number of chips from a given reference point. For example, the AT may define a search window for pilots in the neighbor set as a given number of chips from the AT's current location.

A determination is made at 506 as to whether a detected neighbor may be a candidate for placing in the active set. According to some aspects, the AT may measure the signal strength of the detected neighbor to determine whether it exceeds a predefined threshold. If so, the respective pilot may be placed in the AT's candidate set. If not, the AT may continue to periodically monitor for neighbors.

If a neighbor pilot was moved to the candidate set, the AT may send a route update message to the BS, as depicted at 508. The route update message may identify all pilots in the AT's active set and those in its candidate set. According to some aspects, the route update message may also include those pilots in the AT's neighbor set. In addition to an identification of the pilots, the route update message may also include the detected signal strength.

The BS may review the route update message and determine which pilots should be in the AT's active set based on predefined criteria. For example, the BS may decide based on the detected signal strength. The BS may transmit a traffic channel update (TCA) message to the AT indicating those pilots to be placed in the active set, which is received by the AT, as depicted at 510. The AT then stores the indicated pilots in its active set.

As depicted at 512, the AT may determine whether a search window center for all pilots in its active set is being tracked. If so, the AT may then communicate via any of the pilots in its active set. Typically, the AT will know the location of any pilot it has previously detected. As such, it can track the location of the pilot by assigning a search window centered on the known location. However, in the case of pilots belonging to a pilot group where only a representative pilot was tracked, the AT would not have an updated reference point for tracking the previously undetected pilots in the group. In the event the pilot location is outside the initial active search window, the AT may be unable to locate such pilots as the search will be centered at the AT's current location. More particularly, as the AT has not recorded a location associated with the previously undetected pilots, the AT is unable to provide a new search window center.

As depicted at 516, if a search window center is not being tracked for a pilot in its active set, the AT may determine which pilot group the pilot belongs to. As described above, pilots belonging to the same pilot group have the same PN offset. As depicted at 518, the AT may set the search window center of the non-tracked pilot to that of the corresponding tracked pilot group member. Accordingly, the AT is now able to locate the pilot, and can utilize all pilots in the pilot group. This may improve throughput of the AT by allowing the AT to utilize one or more of the previously untracked pilots.

Figure 6:
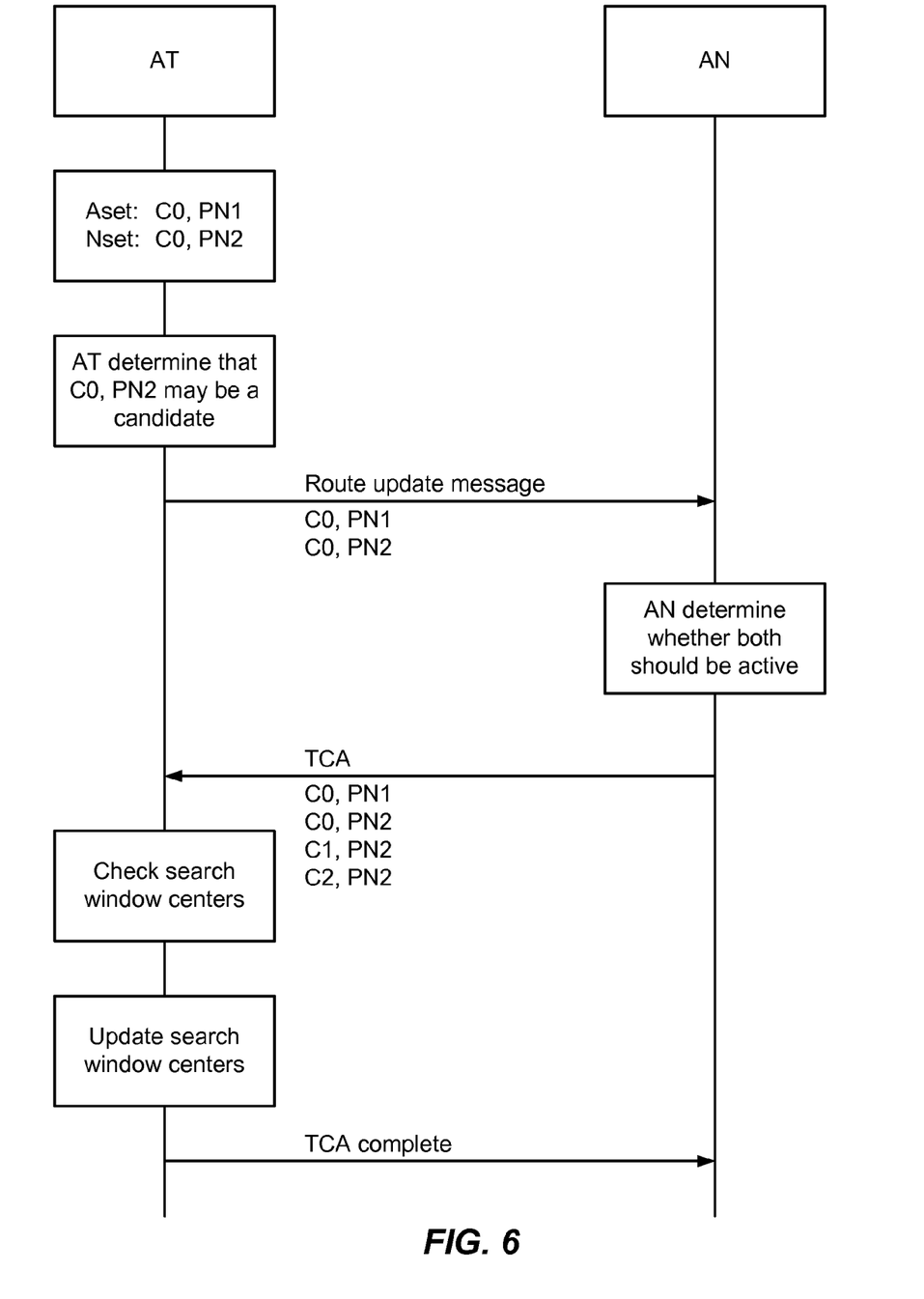
FIG. 6 is a call flow diagram depicting an exemplary pilot detection communication flow, in accordance with various disclosed aspects.

FIG. 6 is an exemplary call flow diagram depicting communications between an AT and an AN (or a base station of the AN). As depicted at 602, the AT may have initially associated therewith an active set (ASet) which includes a first pilot (C0, PN1). The AT may also have one pilot in its neighbor set (NSet)—pilot (C0, PN2). The neighboring pilot may have been detected by the AT, or may have been supplied by the AN.

While monitoring both pilots, the AT may determine based on one or more predetermined criteria that the NSet pilot (C0, PN2) may be a candidate for addition to its active set, as depicted at 604. The AT may then move the pilot into its candidate set (CSet). As depicted at 606, the AT may transmit a Route Update message to the AN identifying its stored/detected pilots. Thus, in this example, the Route Update message includes pilots (C0, PN1) and (C0, PN2). The Route Update message may also include one or more parameters associated with each pilot, such as, for example, detected signal strength.

As depicted at 608, the AN may determine whether the pilots reported in the Route Update message should be included in the AT's active set based on one or more pre-defined conditions. For example, the AN may decide whether a pilot should be included in the active set based on a signal strength threshold or any other parameter. Upon determining which pilots are to be place in the AT's active set, the AN transmits a Traffic Condition Assignment (TCA) message to the AN designating those pilots which are to be stored in the active set.

In accordance with this example, pilot (C0, PN2) may belong to a pilot group also comprising pilots (C1, PN2) and (C2, PN2). Though not previously detected by the AT, the AN may include all pilots belonging to the same group as a detected pilot group in its TCA message. As depicted, at 610, the AT may determine, for each pilot identified in the TCA message, whether its search window center is being tracked. At step 612, the AT may update the search window centers as needed for those pilots not being tracked, as described above with reference to FIG. 5.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 7:
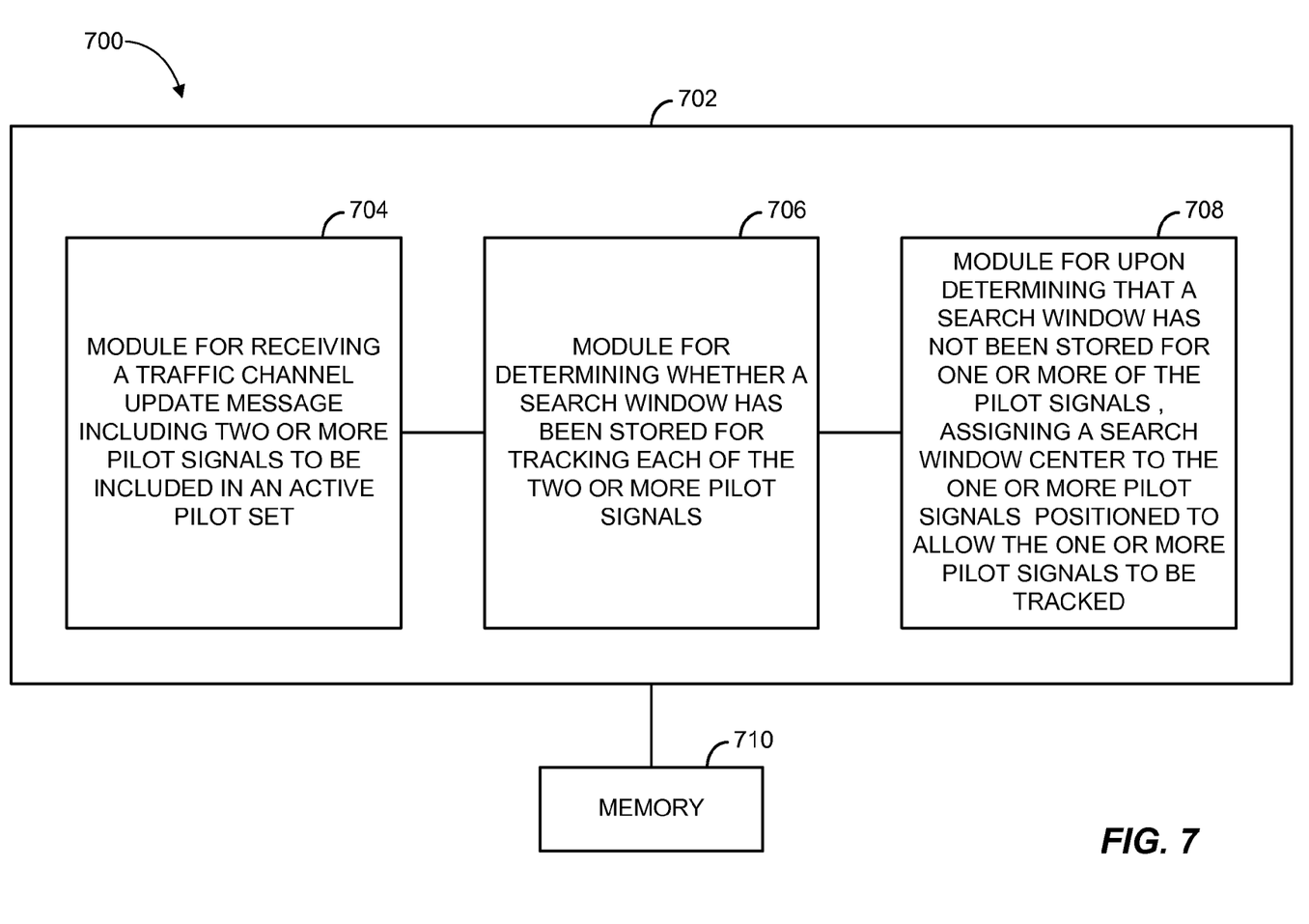
FIG. 7 is an illustration of an example system that detect pilot signals, in accordance with various disclosed aspects.

With reference to FIG. 7, illustrated is a system 700 that detects pilot signals in a multi-carrier network. For example, system 700 can reside at least partially within an access terminal. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include a module for receiving a traffic channel update message including two or more pilot singles to be included in an active pilot set 704.

Further, logical grouping 702 can comprise a module for determining whether each of the two or more pilot signals can be tracked 706. Furthermore, logical grouping 702 can comprise a module for, upon determining that one or more of the pilot signals cannot be tracked, assigning a search window center to the one or more pilot signals that cannot be tracked positioned to allow the one or more pilot signals to be tracked 708. Additionally, system 700 can include a memory 710 that retains instructions for executing functions associated with electrical components 704, 706, and 708. While shown as being external to memory 710, it is to be understood that one or more of electrical components 704, 706, and 708 can exist within memory 710.

Figure 8:
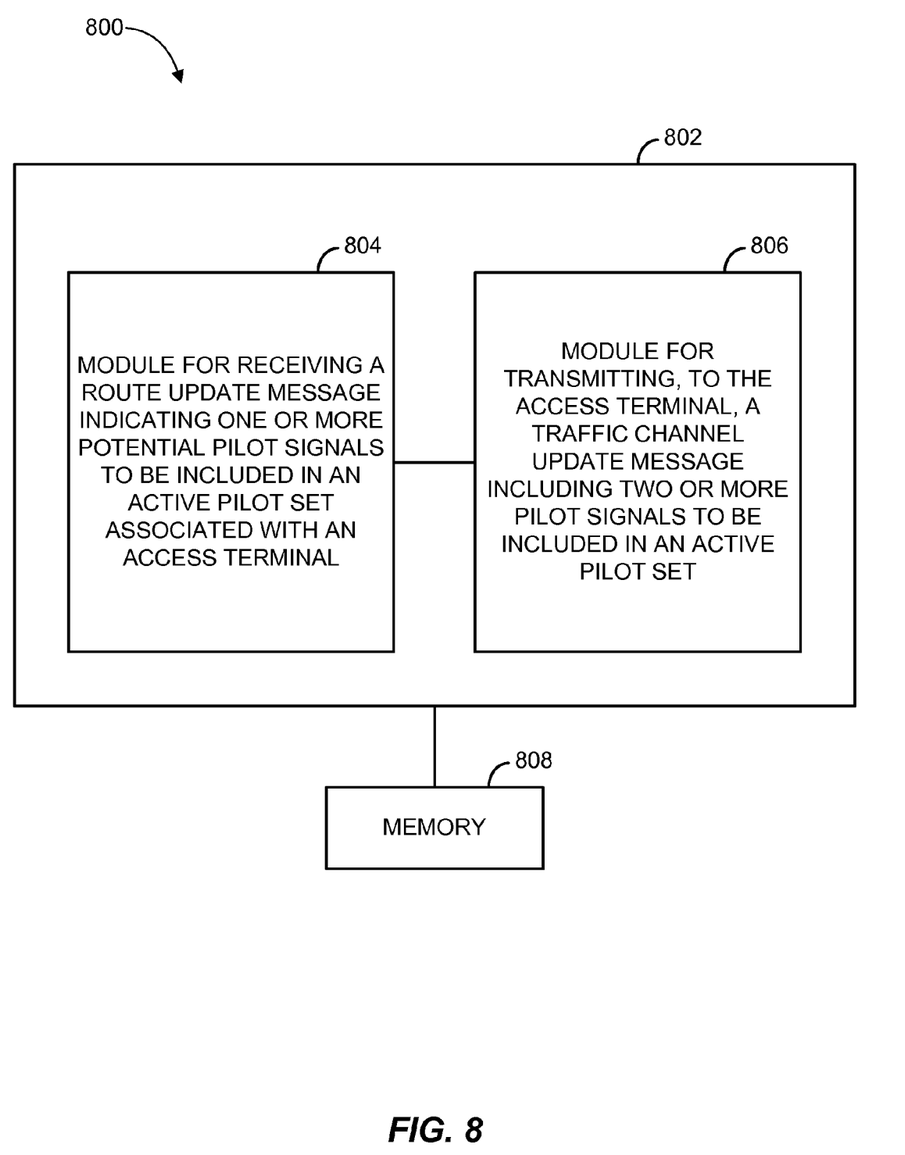
FIG. 8 is an illustration of an example system that assigns pilot signals, in accordance with various disclosed aspects.

Turning to FIG. 8, illustrated is a system 800 that assigns pilot signals in a multi-carrier wireless network. For example, system 800 can reside at least partially within an access network. As depicted, system 800 includes functional blocks that can represent functions implemented by a processor, software, or combination thereof (e.g., firmware). System 800 includes a logical grouping 802 of electrical components that receiving and processing messages. Logical grouping 802 can include a module for receiving a route update message indicating one or more potential pilot signals to be included in an active pilot set 804. Moreover, logical grouping 802 can include a module for transmitting, to an access terminal, a channel update message including two or more pilot singles to be included in an active pilot set 806. In this regard, the access terminal may determine whether each of the two or more pilot signals can be tracked, and upon determining that one or more of the pilot signals cannot be tracked, assigns a search window center to the one or more pilots signals that cannot be tracked positioned to allow the one or more pilot signals to be tracked. Additionally, system 800 can include a memory 808 that retains instructions for executing functions associated with electrical components 804 and 806.

While shown as being external to memory 808, it is to be understood that electrical components 804 and 806 can exist within memory 808.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. At least one processor configured to detect pilot signals in a multi-carrier wireless network, comprising:
   a first module for receiving a traffic channel update message including two or more pilot signals to be included in an active pilot set;
   a second module for determining whether a search window has been stored for tracking each of the two or more pilot signals; and
   a third module for, upon determining that a search window has not been stored for one or more of the pilot signals, assigning a search window center to the one or more pilot signals which allows the one or more pilot signals to be tracked,
   wherein the one or more of the pilot signals for which the access terminal has not stored a search window belongs to a pilot group, the pilot group including at least one pilot signal for which the access terminal has stored a search window, and wherein the assigning further comprises assigning a known search window center associated with the member of the pilot group for which the access terminal has stored a search window to the one or more pilot signals for which the access terminal has not stored a search window and which belongs to the pilot group.

2. A computer program product, comprising:
   a non-transitory computer-readable medium comprising:
      a first set of codes for causing a computer to receive a traffic channel update message including two or more pilot signals to be included in an active pilot set;
      a second set of codes for causing the computer to determine whether a search window has been stored for tracking each of the two or more pilot signals; and
      a third set of codes for causing the computer to, upon determining that a search window has not been stored for one or more of the pilot signals, assign a search window center to the one or more pilot signals which allows the one or more pilot signals to be tracked,
   wherein the one or more of the pilot signals for which the access terminal has not stored a search window belongs to a pilot group, the pilot group including at least one pilot signal for which the access terminal has stored a search window, and wherein the assigning further comprises assigning a known search window center associated with the member of the pilot group for which the access terminal has stored a search window to the one or more pilot signals for which the access terminal has not stored a search window and which belongs to the pilot group.

3. An apparatus, comprising:
   means for receiving a traffic channel update message including two or more pilot signals to be included in an active pilot set;
   means for determining whether a search window has been stored for tracking each of the two or more pilot signals; and
   means for, upon determining that a search window has not been stored for one or more of the pilot signals, assigning a search window center to the one or more pilot signals which allows the one or more pilot signals to be tracked,
   wherein the one or more of the pilot signals for which the access terminal has not stored a search window belongs to a pilot group, the pilot group including at least one pilot signal for which the access terminal has stored a search window, and wherein the assigning further comprises assigning a known search window center associated with the member of the pilot group for which the access terminal has stored a search window to the one or more pilot signals for which the access terminal has not stored a search window and which belongs to the pilot group.

4. A method for detecting pilot signals in a multi-carrier network environment, comprising:
   receiving, at an access terminal, a traffic channel update message including two or more pilot signals to be included in an active pilot set;
   determining whether the access terminal has stored a search window for tracking each of the two or more pilot signals; and
   upon determining that the access terminal has not stored a search window for one or more of the pilot signals, assigning a search window center to the one or more pilot signals positioned to allow the one or more pilot signals to be tracked,
   wherein the one or more of the pilot signals for which the access terminal has not stored a search window belongs to a pilot group, the pilot group including at least one pilot signal for which the access terminal has stored a search window, and wherein the assigning further comprises assigning a known search window center associated with the member of the pilot group for which the access terminal has stored a search window to the one or more pilot signals for which the access terminal has not stored a search window and which belongs to the pilot group.

5. An apparatus for detecting pilot signals in a multi-carrier wireless network, comprising:
- a receiver configured to receive a traffic channel update message including two or more pilot signals to be included in an active pilot set;
- a pilot detector for maintaining one or more sets of pilot signals; and
- a search window calculator configured to determine whether a search window has been stored for each of the two or more pilot signals enabling each of the two or more pilot signals to be tracked, and upon determining that one or more of the pilot signals does not have a stored search window, to assign a search window center to the one or more pilot signals positioned to allow the one or more pilot signals to be tracked,
- wherein the one or more of the pilot signals that do not have a stored search window belongs to a pilot group, the pilot group including at least one pilot signal for which a search window was stored, and
- wherein the search window calculator is further configured to assign a known search window center associated with the member of the pilot group for which a search window was stored to the one or more pilot signals for a search window has not be stored and which belongs to the pilot group.

6. The method of claim 4,
wherein the search window center represents a location associated with a previously detected pilot signal.

7. The method of claim 4, wherein determining whether the access terminal has stored a search window for tracking each of the two or more pilot signals comprises determining whether the pilot signal was previously detected and stored by the access terminal.

8. The method of claim 4, wherein each member of the pilot group has a common pseudo-random number (PN) offset associated therewith.

9. The apparatus of claim 5,
wherein the search window center represents a location associated with a previously detected pilot signal.

10. The apparatus of claim 5, wherein search window calculator is further configured to determine whether each of the two or more pilot signals was previously detected and stored by the access terminal.

11. The apparatus of claim 5, wherein each member of the pilot group has a common pseudo-random number (PN) offset associated therewith.

* * * * *